(12) United States Patent
Arai et al.

(10) Patent No.: US 8,842,240 B2
(45) Date of Patent: Sep. 23, 2014

(54) LIQUID CRYSTAL DISPLAY APPARATUS FOR BOTH REFLECTIVE DISPLAY SCHEME AND TRANSMISSIVE DISPLAY SCHEME

(75) Inventors: Norihiro Arai, Hino (JP); Toshiharu Nishino, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 706 days.

(21) Appl. No.: 12/983,394

(22) Filed: Jan. 3, 2011

(65) Prior Publication Data

US 2011/0164207 A1    Jul. 7, 2011

(30) Foreign Application Priority Data

Jan. 6, 2010    (JP) ................................. 2010-001462

(51) Int. Cl.
   *G02F 1/1335*    (2006.01)
   *G02F 1/1347*    (2006.01)

(52) U.S. Cl.
   CPC ................................... *G02F 1/1347* (2013.01)
   USPC ............................................ 349/96; 349/113

(58) Field of Classification Search
   USPC .................. 349/64, 67, 74, 96–101, 113–115
   See application file for complete search history.

(56) References Cited

U.S. PATENT DOCUMENTS

| | | | |
|---|---|---|---|
| 5,541,753 A * | 7/1996 | Raynes et al. | 349/200 |
| 5,686,979 A | 11/1997 | Weber et al. | |
| 7,821,599 B2 | 10/2010 | Mimura et al. | |
| 7,916,223 B2 | 3/2011 | Kitagawa et al. | |
| 8,045,098 B2 | 10/2011 | Kitagawa et al. | |
| 8,102,487 B2 | 1/2012 | Kitagawa et al. | |
| 2006/0033865 A1 | 2/2006 | Tanaka et al. | |

FOREIGN PATENT DOCUMENTS

| | | | |
|---|---|---|---|
| CN | 101135795 A | 3/2008 | |
| JP | 11-508377 A | 7/1999 | |
| JP | 2001-083502 A | 3/2001 | |
| JP | 2001-201764 A | 7/2001 | |
| JP | 2001-228333 A | 8/2001 | |
| JP | 2002-090773 A | 3/2002 | |
| JP | 2002090773 * | 3/2002 | ............... G02B 5/30 |

(Continued)

OTHER PUBLICATIONS

Korean Office Action dated Mar. 29, 2012 (and English translation thereof) in counterpart Korean Application No. 10-2011-0000730.

(Continued)

*Primary Examiner* — Uyen Chau N Le
*Assistant Examiner* — Michael Mooney
(74) *Attorney, Agent, or Firm* — Holtz Holtz Goodman & Chick PC

(57) ABSTRACT

A liquid crystal display apparatus includes a first polarizing plate, a liquid crystal display cell, a second polarizing plate, a switching cell, a first reflective polarizing plate, and a surface light source, which are arranged in this order. The apparatus further includes a control driving unit to switch the switching cell between a first and second state. In the first state, plane of polarization of polarized light emitted by the surface light source and transmitted through the first reflective polarizing plate and the switching cell is coincident with a transmissive axis of the second polarizing plate. In the second state, a plane of polarization of the polarized light input to the liquid crystal display cell from the side of the first polarizing plate and transmitted through the second polarizing plate and the switching cell is coincident with a reflective axis of the first reflective polarizing plate.

20 Claims, 10 Drawing Sheets

(56) References Cited

FOREIGN PATENT DOCUMENTS

| | | |
|---|---|---|
| JP | 2002-107725 A | 4/2002 |
| JP | 2003-005181 A | 1/2003 |
| JP | 2004-093715 A | 3/2004 |
| JP | 2004-117652 A | 4/2004 |
| JP | 2004-361727 A | 12/2004 |
| JP | 2005-043698 A | 2/2005 |
| JP | 2005-121998 A | 5/2005 |
| JP | 2007-219172 A | 8/2007 |
| JP | 2008-046329 A | 2/2008 |
| KR | 10-2002-0094854 A | 12/2002 |
| KR | 2007-0103321 A | 10/2007 |

OTHER PUBLICATIONS

Japanese Office Action dated Jun. 11, 2013 (and English translation thereof) in counterpart Japanese Application No. 2010-001462.

Chinese Office Action dated Mar. 21, 2012 (and English translation thereof) in counterpart Chinese Application No. 201010614649.4.

Two Korean Office Actions dated Sep. 17, 2012 (and English translations thereof) in counterpart Korean Application No. 10-2011-0000730.

Japanese Office Action mailed Jan. 29, 2013 (and English translation thereof), issued in counterpart Japanese Application No. 2010-001462.

* cited by examiner

LIQUID CRYSTAL DISPLAY APPARATUS FOR BOTH REFLECTIVE DISPLAY SCHEME AND TRANSMISSIVE DISPLAY SCHEME

CROSS-REFERENCE TO RELATED APPLICATIONS

This application is based upon and claims the benefit of priority from prior Japanese Patent Application No. 2010-001462, filed Jan. 6, 2010, the entire contents of which are incorporated herein by reference.

BACKGROUND OF THE INVENTION

1. Field of the Invention

The present invention relates to a liquid crystal display apparatus and, more particularly, to a liquid crystal display apparatus used for both the reflective display scheme and the transmissive display scheme.

2. Description of the Related Art

In a dark environment such as indoors, generally, a liquid crystal display apparatus can obtain visible display by using transmissive display which performs display using transmitted light emitted by a surface light source arranged on the back surface of a liquid crystal panel. In a relatively bright environment such as outdoors, poor visibility is obtained by the transmissive display because of relative shortage in the brightness of the surface light source. When the surface light source emits light brighter than the ambient light, power consumption increases. On the other hand, in a bright environment such as outdoors, visible display can be obtained by using reflective display, in which light that has entered from the surroundings to the liquid crystal display apparatus is reflected by the back surface of the liquid crystal panel, and display is performed using the reflected light. In a dark environment such as indoors, the reflective display suffers shortage in the brightness.

There is known a reflective/transmissive liquid crystal display apparatus that is usable as both a reflective liquid crystal display apparatus and a transmissive liquid crystal display apparatus. The reflective/transmissive liquid crystal display apparatus has the advantages of the two display schemes. For example, JP-A 2002-107725 (KOKAI) discloses a reflective/transmissive liquid crystal display apparatus which arranges the surface light source on the other side of the observation side of the liquid crystal panel, and a transflective film between the liquid crystal panel and the surface light source. For example, JP-A 2004-93715 (KOKAI) discloses a reflective/transmissive liquid crystal display apparatus which arranges the surface light source on the other side of the observation side of the liquid crystal panel, and divides each of the plurality of pixels of the liquid crystal display device into two regions. One of the regions is used for reflective display by inserting a reflective film between the liquid crystal panel and the surface light source, whereas the other region is used for transmissive display.

For example, both the reflective/transmissive liquid crystal display apparatuses disclosed in JP-A 2002-107725 (KOKAI) and JP-A 2004-93715 (KOKAI) aim at uniting the performance of a reflective liquid crystal display apparatus and that of a transmissive liquid crystal display apparatus. However, although capable of functioning as both a reflective liquid crystal display apparatus and a transmissive liquid crystal display apparatus, they obtain only darker display and poorer visibility as a reflective liquid crystal display apparatus or a transmissive liquid crystal display apparatus as compared to an apparatus dedicated to reflective display or transmissive display.

BRIEF SUMMARY OF THE INVENTION

According to an aspect of the invention, a liquid crystal display apparatus includes a first polarizing plate; a liquid crystal display cell adjacent to the first polarizing plate; a second polarizing plate arranged on a side of the liquid crystal display cell opposite to the first polarizing plate; a first reflective polarizing plate adjacent to the second polarizing plate on a side opposite to the liquid crystal display cell, wherein a transmissive axis of the first reflective polarizing plate is coincident with a transmissive axis of the second polarizing plate; a switching cell arranged on a side of the first reflective polarizing plate opposite to the second polarizing plate, wherein the switching cell is configured to rotate a plane of polarization of light passing through the switching cell; a second reflective polarizing plate arranged on a side of the switching cell opposite to the first reflective polarizing plate; a surface light source arranged on a side of the second reflective polarizing plate opposite to the switching cell; and a control driving unit configured to switch the switching cell between a first state and a second state, wherein the first state is a state in which a plane of polarization of polarized light emitted by the surface light source and transmitted through the second reflective polarizing plate and the switching cell is coincident with the transmissive axis of the first reflective polarizing plate and the transmissive axis of the second polarizing plate, and a plane of polarization of polarized light input to the liquid crystal display cell from a side of the first polarizing plate and transmitted through the second polarizing plate, the first reflective polarizing plate and the switching cell is coincident with a transmissive axis of the second reflective polarizing plate, and wherein the second state is a state in which the plane of polarization of the polarized light emitted by the surface light source and transmitted through the second reflective polarizing plate and the switching cell is coincident with a reflective axis of the first reflective polarizing plate and an absorption axis of the second polarizing plate, and the plane of polarization of the polarized light input to the liquid crystal display cell from the side of the first polarizing plate and transmitted through the second polarizing plate, the first reflective polarizing plate and the switching cell is coincident with a reflective axis of the second reflective polarizing plate.

According to another aspect of the invention, a liquid crystal display apparatus includes a first polarizing plate; an active matrix liquid crystal display cell adjacent to the first polarizing plate; a second polarizing plate arranged on a side of the active matrix liquid crystal display cell opposite to the first polarizing plate; a first reflective polarizing plate adjacent to the second polarizing plate on a side opposite to the active matrix liquid crystal display cell, wherein a transmissive axis of the first reflective polarizing plate is coincident with a transmissive axis of the second polarizing plate; a switching cell arranged on a side of the first reflective polarizing plate opposite to the second polarizing plate, wherein the switching cell is configured to rotate a plane of polarization of light passing through the switching cell; a second reflective polarizing plate arranged on a side of the switching cell opposite to the first reflective polarizing plate; a surface light source arranged on a side of the second reflective polarizing plate opposite to the switching cell; and a control driving unit configured to switch the switching cell between a first state and a second state, wherein the first state is a state in which a plane of polarization of polarized light emitted by the surface light source and transmitted through the second reflective polarizing plate and the switching cell is coincident with the transmissive axis of the first reflective polarizing plate and the transmissive axis of the second polarizing plate, and a plane of polarization of polarized light input to the active matrix liquid crystal display cell from a side of the first polarizing plate and transmitted through the second polarizing plate, the first reflective polarizing plate and the switching cell is coincident with a transmissive axis of the second reflective polarizing plate, and wherein the second state is a state in which the plane of polarization of the polarized light emitted by the surface light source and transmitted through the second reflective polarizing plate and the switching cell is coincident with a reflective axis of the first reflective polarizing plate and an absorption axis of the second polarizing plate, and the plane of polarization of the polarized light input to the active matrix liquid crystal display cell from the side of the first polarizing plate and transmitted through the second polarizing plate, the first reflective polarizing plate and the switching cell is coincident with a reflective axis of the second reflective polarizing plate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 is a view for explaining the optical path when the switching cell of the liquid crystal display apparatus according to the first embodiment of the present invention is ON;

FIG. 8 is a view for explaining the optical path when the switching cell of the liquid crystal display apparatus according to the first modification of the first embodiment of the present invention is ON;

DETAILED DESCRIPTION OF THE INVENTION

First Embodiment

Figure 1:
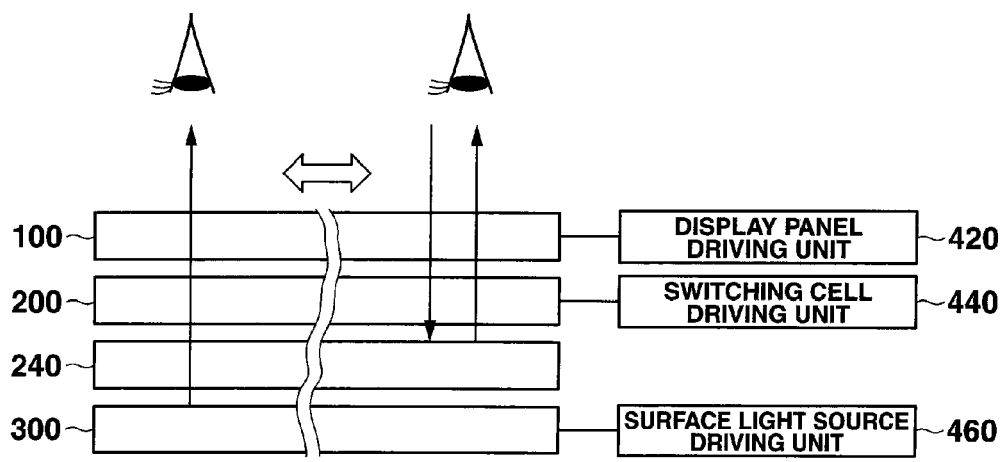
FIG. 1 is a view schematically showing an example of the arrangement of a liquid crystal display apparatus according to each embodiment of the present invention.

The first embodiment of the present invention will be described with reference to the accompanying drawings. As shown in the schematic view of FIG. 1, a liquid crystal display apparatus includes a display panel 100, switching cell 200, reflective polarizing plate 240, surface light source 300, display panel driving unit 420, switching cell driving unit 440, and surface light source driving unit 460.

The display panel 100 is a generally known twisted nematic liquid crystal display panel, which is driven by the display panel driving unit 420 to display an image. The surface light source 300 is driven by the surface light source driving unit 460 so as to function as the backlight of the display panel 100. The reflective polarizing plate 240 is an optical element which has the property of reflecting polarized light having a plane of polarization in the reflective axis direction and transmitting polarized light having a plane of polarization in the transmissive axis direction perpendicular to the reflective axis. The switching cell 200 is driven by the switching cell driving unit 440 serving as a control driving unit and has a function of switching the display scheme of the liquid crystal display apparatus between transmissive display and reflective display. In the transmissive display whose optical path is indicated by the arrow on the left side of FIG. 1, light emitted by the surface light source 300 and transmitted through the reflective polarizing plate 240 and the switching cell 200 is guided to the display panel 100 so as to cause the observer to observe an image. In the reflective display whose optical path is indicated by the arrows on the right side of FIG. 1, light that has entered from the observer side is reflected by the reflective polarizing plate 240 and guided to the display panel 100 so as to cause the observer to observe an image.

Figure 2:
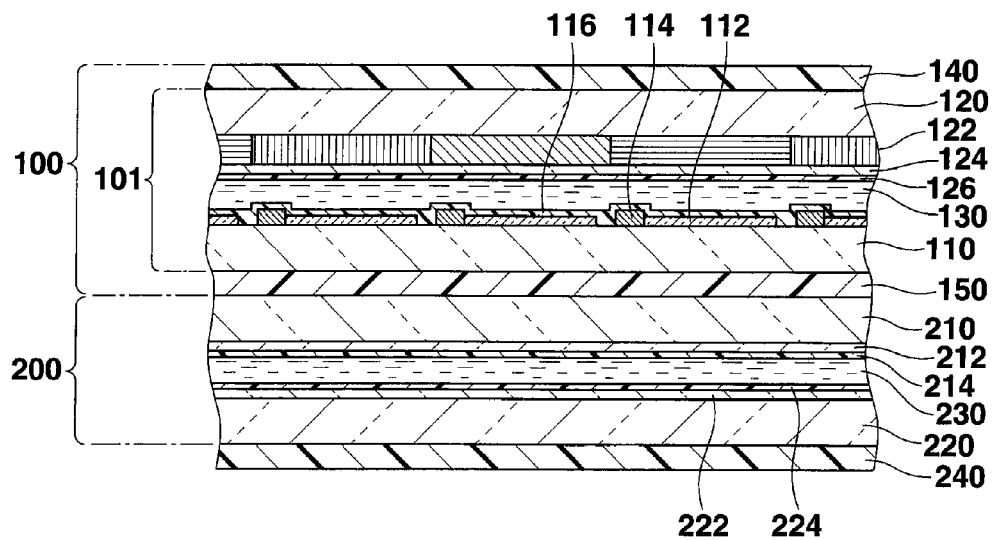
FIG. 2 is a sectional view showing an example of the portion of the display panel, switching cell, and reflective polarizing plate of a liquid crystal display apparatus according to the first embodiment of the present invention.

FIG. 2 is an enlarged sectional view of the portion of the display panel 100, switching cell 200, and reflective polarizing plate 240 of the liquid crystal display apparatus according to this embodiment. The display panel 100 is a generally known twisted nematic liquid crystal display panel which has a liquid crystal display cell 101 sandwiched between an observation-side polarizing plate 140 and a back surface-side polarizing plate 150. The liquid crystal display cell 101 has a thin-film transistor (TFT)-side substrate 110 and a color filter (CF)-side substrate 120, both of which are transparent substrates such as glass substrates and face each ether. A pixel electrode 112 including a transparent conductive film such as an indium tin oxide (ITO) film is formed on the TFT-side substrate 110 for each sub pixel. Each pixel electrode 112 is connected to a thin-film transistor (TFT) 114 formed on the TFT-side substrate 110 and serving as the switch of the pixel electrode 112. A TFT-side alignment film 116 is formed on the TFT-side substrate 110 so as to cover the pixel electrodes 112, TFTs 114, lines (not shown), and the like. The TFT-side alignment film 116 undergoes an aligning treatment by rubbing.

A color filter 122 is formed on the CF-side substrate 120. A common electrode 124 made of, for example, ITO is formed on the color filter 122. A CF-side alignment film 126 is formed on the common electrode 124 and undergoes an aligning treatment by rubbing.

The TFT-side substrate 110 and the CF-side substrate 120 are arranged while making the TFT-side alignment film 116 and the CF-side alignment film 126 face each other. The two substrates are bonded at the outer periphery by a sealing material (riot shown) so as to form a predetermined space between them. Liquid crystal molecules are sealed in the space surrounded by the TFT-side alignment film 116, CF-side alignment film 126, and sealing material, thereby forming a display panel liquid crystal layer 130.

The observation-side polarizing plate 140 serving as a first polarizing plate is bonded to a surface of the CF-side substrate 120 on the other side of the surface with the color filter 122. The back surface-side polarizing plate 150 serving as a second polarizing plate is bonded to a surface of the TFT-side substrate 110 on the other side of the surface with the pixel electrodes 112. For the sake of simplicity, FIG. 2 does not illustrate elements such as a black matrix, various kinds of electrodes, and optical film which are not necessary for the description of the embodiment.

The switching cell 200 includes a display panel-side substrate 210 serving as a first substrate and a backlight-side substrate 220 serving as a second substrate, both of which are transparent substrates such as glass substrates. A display panel-side electrode 212 serving as a first electrode made of, for example, ITO is solidly formed on the entire surface of the display panel-side substrate 210. A display panel-side alignment film 214 serving as a first alignment film is formed on the display panel-side electrode 212 and undergoes an aligning treatment by rubbing. A backlight-side electrode 222 serving as a second electrode made of, for example, ITO is solidly formed on the entire surface of the backlight-side substrate 220. A backlight-side alignment film 224 serving as a second alignment film is formed on the backlight-side electrode 222 and undergoes an aligning treatment by rubbing.

The display panel-side substrate 210 and the backlight-side substrate 220 are arranged while making the display panel-side alignment film 214 and the backlight-side alignment film 224 face each other. The two substrates are bonded at the outer periphery by a sealing material (not shown) so as to form a predetermined space between them. Liquid crystal molecules are sealed in the space surrounded by the display panel-side alignment film 214, backlight-side alignment film 224, and sealing material, thereby forming a switching cell liquid crystal layer 230.

The switching cell 200 is bonded to the display panel 100 such that the display panel-side substrate 210 is placed on the side of the display panel 100. That is, the switching cell 200 shares the back surface-side polarizing plate 150 of the display panel 100.

The reflective polarizing plate 240 serving as a second reflective polarizing plate is bonded to a surface of the backlight-side substrate 220 on the other side of the surface with the backlight-side electrode 222. The surface light source 300 serving as a backlight shown in FIG. 1 is arranged on the other side of the surface of the reflective polarizing plate 240 bonded to the switching cell 200.

Figure 3:
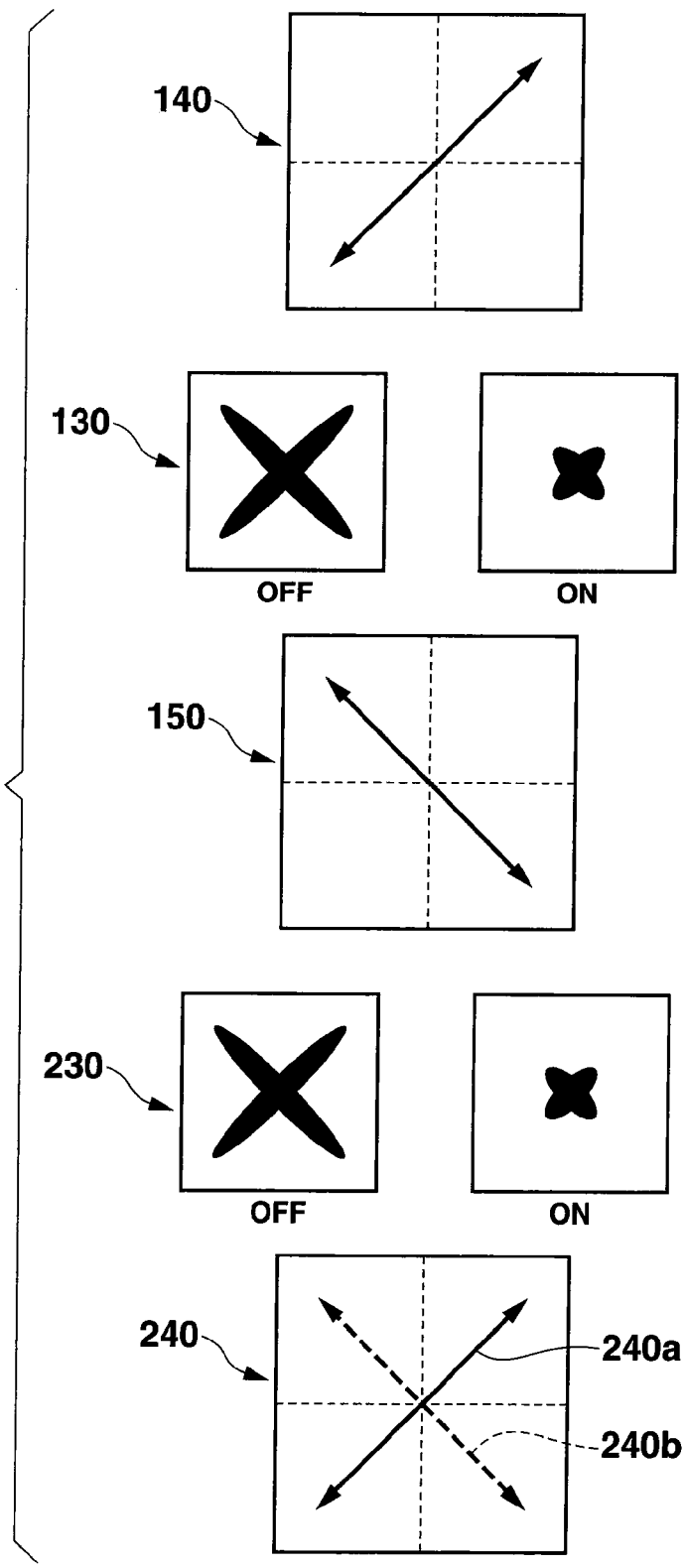
FIG. 3 is a view showing an example of the optical arrangement of the liquid crystal display apparatus according to the first embodiment of the present invention.

The optical arrangement of the display panel liquid crystal layer 130, observation-side polarizing plate 140, back surface-side polarizing plate 150, switching cell liquid crystal layer 230, and reflective polarizing plate 240 of the liquid crystal display apparatus according to the embodiment will be described next with reference to FIG. 3. Referring to FIG. 3, the solid arrows on the observation-side polarizing plate 140 and the back surface-side polarizing plate 150 indicate the directions of the transmissive axes of the observation-side polarizing plate 140 and the back surface-side polarizing plate 150. The solid arrow on the reflective polarizing plate 240 indicates the direction of the transmissive axis of the reflective polarizing plate 240. The broken arrow indicates the direction of the reflective axis. The transmissive axis of the observation-side polarizing plate 140 and that of the back surface-side polarizing plate 150 are perpendicular to each other. A reflective polarizing plate transmissive axis 240a that is the transmissive axis of the reflective polarizing plate 240 is coincident with the transmissive axis of the observation-side polarizing plate 140 and perpendicular to the transmissive axis of the back surface-side polarizing plate 150. A reflective polarizing plate reflective axis 240b is perpendicular to the reflective polarizing plate transmissive axis 240a, coincident with the transmissive axis of the back surface-side polarizing plate 150, and perpendicular to the transmissive axis of the observation-side polarizing plate 140. Relative positional relationships are significant concerning the above-described optical axes such as the transmissive axes of the observation-side polarizing plate 140, back surface-side polarizing plate 150, and reflective polarizing plate 240. Hence, any positional relationship to an absolute axis that is defined by, e.g., the horizontal direction of the panel can be adopted. The entire structure may be rotated as far as the relationship is maintained.

In a state wherein no electric field is formed between the pixel electrodes 112 and the common electrode 124 (marked with OFF in FIG. 3), the liquid crystal molecules in the display panel liquid crystal layer 130 are aligned by the TFT-side alignment film 116 and the CF-side alignment film 126. Hence, the liquid crystal molecules are twisted by 90° between the TFT-side alignment film 116 and the CF-side alignment film 126. In this case, the plane of polarization of polarized light passing through the display panel liquid crystal layer 130 is rotated by 90°. The illustration of the display panel liquid crystal layer 130 marked with "OFF" in FIG. 3 schematically indicates the state wherein the polarized light is rotated by 90°. Hence, the alignment direction of liquid crystal molecules can have any positional relationship relative to the absolute positional relationship defined by, for example, the horizontal direction of the panel. FIG. 3 does not refer to the relationship between the rubbing directions of the TFT-side alignment film 116 and the CF-side alignment film 126 and the directions of transmissive axes of the observation-side polarizing plate 140 and the back surface-side polarizing plate 150.

On the other hand, in a state wherein an electric field is formed between the pixel electrodes 112 and the common electrode 124 (marked with ON in FIG. 3), the liquid crystal molecules in the display panel liquid crystal layer 130 are arranged vertically with respect to the TFT-side substrate 110. In this case, the plane of polarization of polarized light passing through the display panel liquid crystal layer 130 is not rotated. The illustration of the display panel liquid crystal layer 130 marked with "ON" in FIG. 3 schematically indicates the state wherein the polarized light is not rotated.

The rubbing directions of the display panel-side alignment film 214 and the backlight-side alignment film 224 of the switching cell liquid crystal layer 230 are also twisted 90° to each other. The liquid crystal molecules in the switching cell liquid crystal layer 230 operate as in the display panel liquid crystal layer 130. In a state wherein no electric field is formed between the display panel-side electrode 212 and the backlight-side electrode 222 (marked with OFF in FIG. 3), the liquid crystal molecules in the switching cell liquid crystal layer 230 are aligned by the display panel-side alignment film 214 and the backlight-side alignment film 224. Hence, the liquid crystal molecules are twisted by 90° between the display panel-side alignment film 214 and the backlight-side alignment film 224. In this case, the plane of polarization of polarized light passing through the switching cell liquid crystal layer 230 is rotated by 90°. On the other hand, in a state wherein an electric field is formed between the display panel-side electrode 212 and the backlight-side electrode 222 (marked with ON in FIG. 3), the liquid crystal molecules in the switching cell liquid crystal layer 230 are arranged vertically with respect to the display panel-side substrate 210. In this case, the plane of polarization of polarized light passing through the switching cell liquid crystal layer 230 is not rotated. The switching cell liquid crystal layer 230 in FIG. 3 is illustrated like the display panel liquid crystal layer 130. Hence, FIG. 3 does not refer to the rubbing directions of the display panel-side alignment film 214 and the backlight-side alignment film 224.

The operation of the liquid crystal display apparatus according to the embodiment will be explained. The display panel 100 is a generally known twisted nematic liquid crystal display panel. The plane of polarization of polarized light that has passed through the back surface-side polarizing plate 150 from its back surface is coincident with the direction of the transmissive axis of the back surface-side polarizing plate 150. The light having the plane of polarization coincident with the transmissive axis of the back surface-side polarizing plate 150 enters the liquid crystal display cell 101.

In a sub pixel of the liquid crystal display cell 101 where no electric field is formed between the pixel electrode 112 and the common electrode 124, since the liquid crystal molecules are twisted by 90° between the TFT-side alignment film 116 and the CF-side alignment film 126, the plane of polarization of transmitted light is rotated by 90°, as described above. As a result, the plane of polarization of the light that has passed through the display panel liquid crystal layer 130 is coincident with the transmissive axis of the observation-side polarizing plate 140. At this time, the light that has passed through the back surface-side polarizing plate 150 from its back surface passes through the liquid crystal display cell 101 and the observation-side polarizing plate 140 and exits to the observation side.

On the other hand, in a sub pixel where an electric field is formed between the pixel electrode 112 and the common electrode 124, since the liquid crystal molecules are arranged vertically with respect to the TFT-side substrate 110, the plane of polarization of transmitted light is not rotated, as described above. As a result, the plane of polarization of the light that has passed through the liquid crystal display cell 101 is perpendicular to the transmissive axis of the observation-side polarizing plate 140 and coincident with the absorption axis. At this time, the light that has passed through the back surface-side polarizing plate 150 from its back surface is absorbed by the observation-side polarizing plate 140 and does not exit to the observation side.

Thus controlling the electric field formed between the pixel electrode 112 and the common electrode 124 for each sub pixel enables to control light transmission of the display panel 100 for each sub pixel. As a result, the display panel 100 can display an image.

Figure 4:
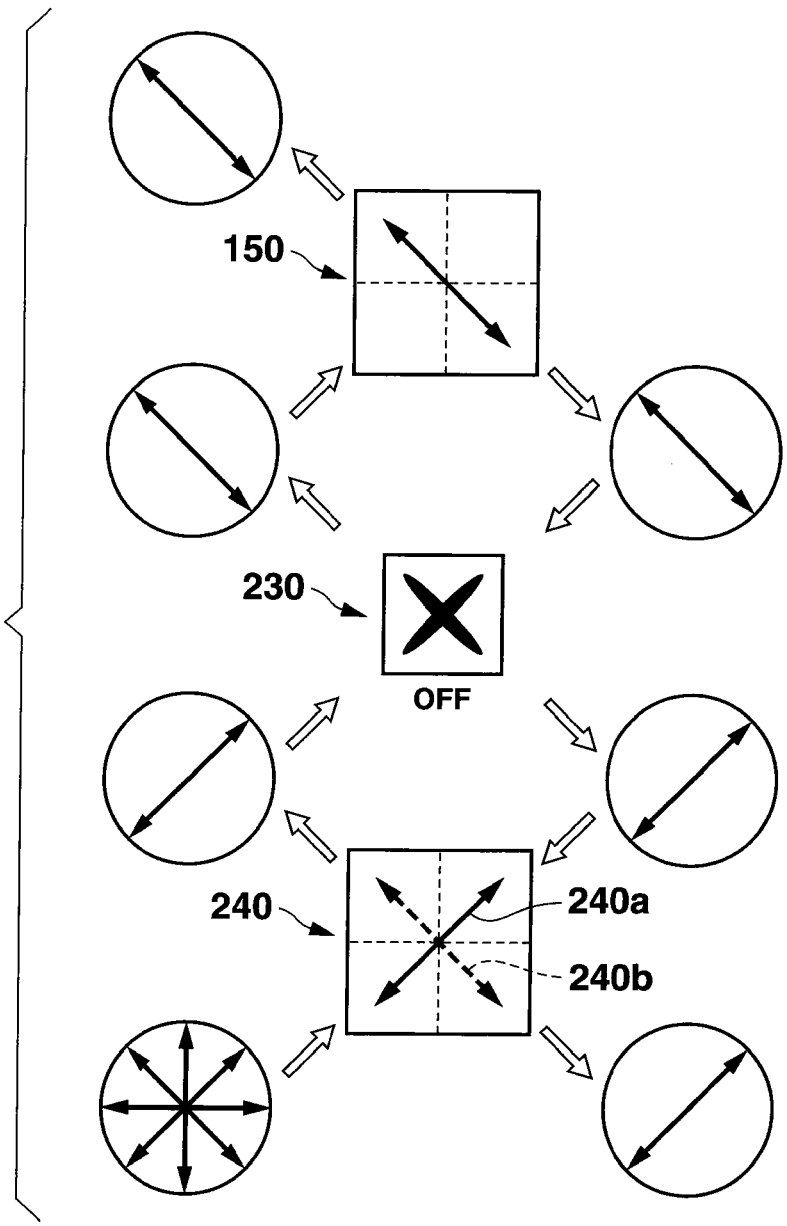
FIG. 4 is a view for explaining the optical path when the switching cell of the liquid crystal display apparatus according to the first embodiment of the present invention is OFF.

The operation of the switching cell 200 according to the embodiment will be described next. A state wherein the switching cell 200 is OFF, that is, no electric field is formed between the display panel-side electrode 212 and the backlight-side electrode 222 will be explained first. At this time, the liquid crystal display apparatus functions as a transmissive liquid crystal display apparatus. This will be described with reference to FIG. 4. The middle column of FIG. 4 schematically illustrates the directions of the optical axes of the back surface-side polarizing plate 150, switching cell liquid crystal layer 230, and reflective polarizing plate 240, as in FIG. 3. On the left column of FIG. 4, each solid arrow in a circle schematically indicates the plane of polarization of light emitted by the surface light source 300 serving as a backlight. Each hollow arrow indicates incidence to or exit from the back surface-side polarizing plate 150, switching cell liquid crystal layer 230, and reflective polarizing plate 240 shown on the middle column. On the right column of FIG. 4, each solid arrow in a circle schematically indicates the plane of polarization of light that has passed through the back surface-side polarizing plate 150 from the side of the display panel 100, as on the left column.

As shown on the left column of FIG. 4, out of the light emitted by the backlight, light whose plane of polarization is coincident with the transmissive axis of the reflective polarizing plate 240 passes through the reflective polarizing plate 240. The plane of polarization of the light that has passed through the reflective polarizing plate 240 is rotated by 90° upon passing through the switching cell liquid crystal layer 230. Hence, the plane of polarization of the light entering the back surface-side polarizing plate 150 is coincident with its transmissive axis. As a result, the light passes through the back surface-side polarizing plate 150. From then on, the behavior of the transmitted light is the same as that of light that has passed through the back surface-side polarizing plate of a general liquid crystal display apparatus.

On the other hand, as shown on the right column of FIG. 4, the plane of polarization of light that has passed through the display panel 100 from the observation side of the liquid crystal display apparatus is coincident with the transmissive axis of the back surface-side polarizing plate 150. The plane of polarization of the light is rotated by 90° upon passing through the switching cell liquid crystal layer 230. Hence, the plane of polarization of the light entering the reflective polarizing plate 240 is coincident with its transmissive axis. As a result, the light that has passed through the display panel 100 passes through the reflective polarizing plate 240. This light is reflected by the backlight surface so as to be reusable as a secondary light source.

As described above, when the switching cell 200 is OFF, the liquid crystal display apparatus functions as a transmissive liquid crystal display apparatus which performs display using light emitted by the backlight.

Figure 5:
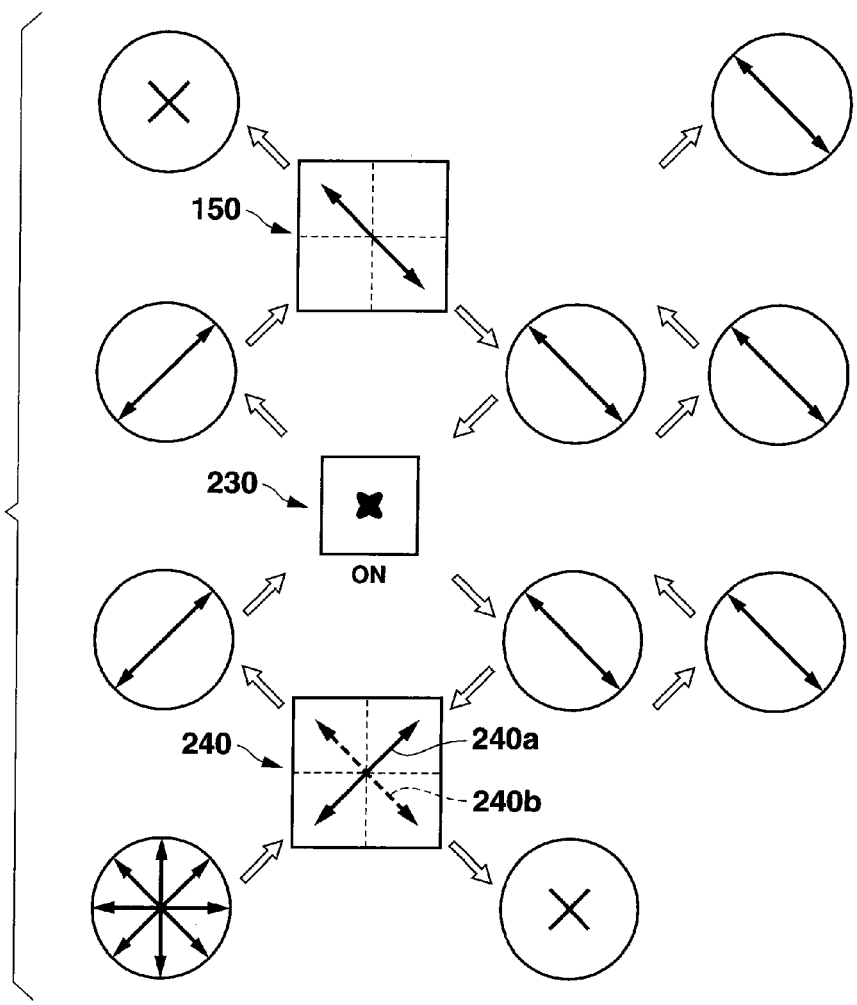

A state wherein switching cell 200 is ON, that is, an electric field is formed between the display panel-side electrode 212 and the backlight-side electrode 222 will be explained next with reference to FIG. 5. The middle column of FIG. 5 schematically illustrates the directions of the optical axes of the back surface-side polarizing plate 150, switching cell liquid crystal layer 230, and reflective polarizing plate 240, as in FIG. 4. The left column schematically illustrates the plane of polarization of light emitted by the backlight, and the right column schematically illustrates the plane of polarization of light that has passed through the back surface-side polarizing plate 150 from the side of the display panel 100. At this time, the liquid crystal display apparatus functions as a reflective liquid crystal display apparatus.

As shown on the right column of FIG. 5, the plane of polarization of light that has passed through the display panel 100 from the observation side of the liquid crystal display apparatus is coincident with the transmissive axis of the back surface-side polarizing plate 150. The plane of polarization of the light is not rotated upon passing through the switching cell liquid crystal layer 230. Hence, the plane of polarization of the light entering the reflective polarizing plate 240 is coincident with its reflective axis. For this reason, the light that has passed through the display panel 100 is reflected by the reflective polarizing plate 240. Since the plane of polarization is perpendicular to the transmissive axis of the reflective polarizing plate 240, the light entering the reflective polarizing plate 240 does not pass through it, unlike in the OFF state of the switching cell 200. This state is indicated by x in FIG. 5.

The light reflected by the reflective polarizing plate 240 passes through the switching cell liquid crystal layer 230 again. At this time, the plane of polarization is not rotated. Hence, the plane of polarization of the light entering the back surface-side polarizing plate 150 is coincident with its transmissive axis. For this reason, the light passes through the back surface-side polarizing plate 150. From then on, the behavior of the transmitted light is the same as that of light that has passed through the back surface-side polarizing plate of a general liquid crystal display apparatus.

On the other hand, as shown on the left column of FIG. 5, out of the light emitted by the backlight, light whose plane of polarization is coincident with the transmissive axis of the reflective polarizing plate 240 passes through the reflective polarizing plate 240. The plane of polarization of the light that has passed through the reflective polarizing plate 240 is net rotated upon passing through the switching cell liquid crystal layer 230. Hence, the plane of polarization of the light entering the back surface side polarizing plate 150 is perpendicular to its transmissive axis and coincident with its absorption axis. For this reason, the light does not pass through the back surface-side polarizing plate 150. This state is indicated by x in FIG. 5.

As described above, when the switching cell 200 is ON, the liquid crystal display apparatus functions as a reflective liquid crystal display apparatus which performs display using light input from the observation side and reflected by the reflective polarizing plate 240.

As described above, according to the liquid crystal display apparatus of the embodiment, it is possible to switch the liquid crystal display apparatus between reflective display and transmissive display turning on/off the switching cell 200. For example, the liquid crystal display apparatus functions as a reflective liquid crystal display apparatus in a bright place such as outdoors and as a transmissive liquid crystal display apparatus in a dark place such as indoors, thereby ensuring display performance with high visibility under any brightness environment.

The arrangement of the liquid crystal display apparatus according to the embodiment never imposes limitations on the performance of the reflective liquid crystal display apparatus or transmissive liquid crystal display apparatus because of, for example, a smaller effective pixel area, unlike the reflective/transmissive liquid crystal display apparatuses disclosed in JP-A 2002-107725 (KOKAI) and JP-A 2004-93715 (KOKAI). Hence, the liquid crystal display apparatus according to the embodiment can increase the effective pixel area and thus obtain high display performance and display a high-quality image under any brightness environment as both the reflective liquid crystal display apparatus and the transmissive liquid crystal display apparatus.

Unlike the conventional liquid crystal display device which increases the brightness of the backlight to obtain high visibility in a bright place such as outdoors, reflective display is used in a bright place such as outdoors so as to suppress power consumption.

This switching is assumed to be performed by a user operating a switch (not shown). In this case, when the apparatus is switched to reflective display, power consumption may be reduced by turning off the backlight.

In the description of the embodiment, the display panel 100 is a twisted nematic liquid crystal display panel. However, the present invention is not limited to this. Also usable is a liquid crystal lay panel of any type such as a super twisted nematic liquid crystal display panel which twists liquid crystal molecules at a twist angle of 180° to 270° between the TFT-side substrate 110 and the CF-side substrate 120, a non-twisted liquid crystal display panel of the VA (Vertical Alignment) scheme which aligns liquid crystal molecules vertically with respect to the TFT-side substrate 110, a horizontal alignment type liquid crystal display panel, including a liquid crystal display panel of the IPS (In-Plane Switching) scheme using an in-plane electric field, which aligns liquid crystal molecules in parallel to the TFT-side substrate 110 by arranging the major axis of the liquid crystal molecules in one direction, or a bend alignment liquid crystal display panel, including a liquid crystal display panel of the OCB (Optically Compensated Birefringence) scheme, which bends liquid crystal molecules with respect to the TFT-side substrate 110. These liquid crystal display apparatuses function like the liquid crystal display apparatus of the embodiment if the back surface-side polarizing plate of the liquid crystal display panel functions as the back surface-side polarizing plate 150, and the switching cell 200 has the same arrangement as described above.

First Modification of First Embodiment

The first modification of the first, embodiment will be described. In this modification, the difference from the first embodiment will be explained. The same reference numerals as in the first embodiment denote the seine parts, and a description thereof will not be repeated.

Figure 6:
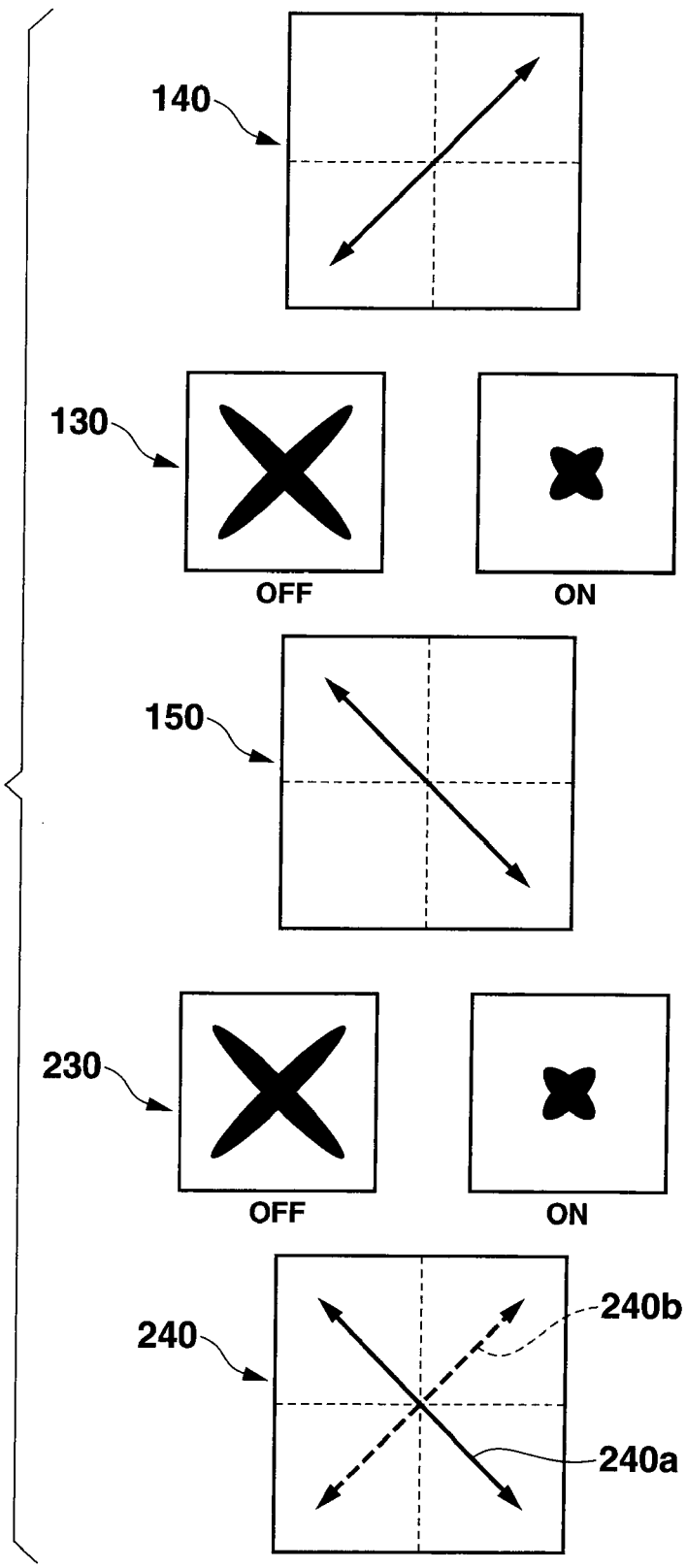
FIG. 6 is a view showing an example of the optical arrangement of a liquid crystal display apparatus according to the first modification of the first embodiment of the present invention.

In the first embodiment, the reflective polarizing plate transmissive axis 240a is coincident with the transmissive axis of the observation-side polarizing plate 140. In this modification, as shown in FIG. 6, the reflective polarizing plate transmissive axis 240a is coincident with the transmissive axis of the back surface-side polarizing plate 150 and perpendicular to the transmissive axis of the observation-side polarizing plate 140. The reflective polarizing plate reflective axis 240b is perpendicular to the reflective polarizing plate transmissive axis 240a, perpendicular to the transmissive axis of the back surface-side polarizing plate 150, and coincident with the transmissive axis of the observation-side polarizing plate 140.

Figure 7:
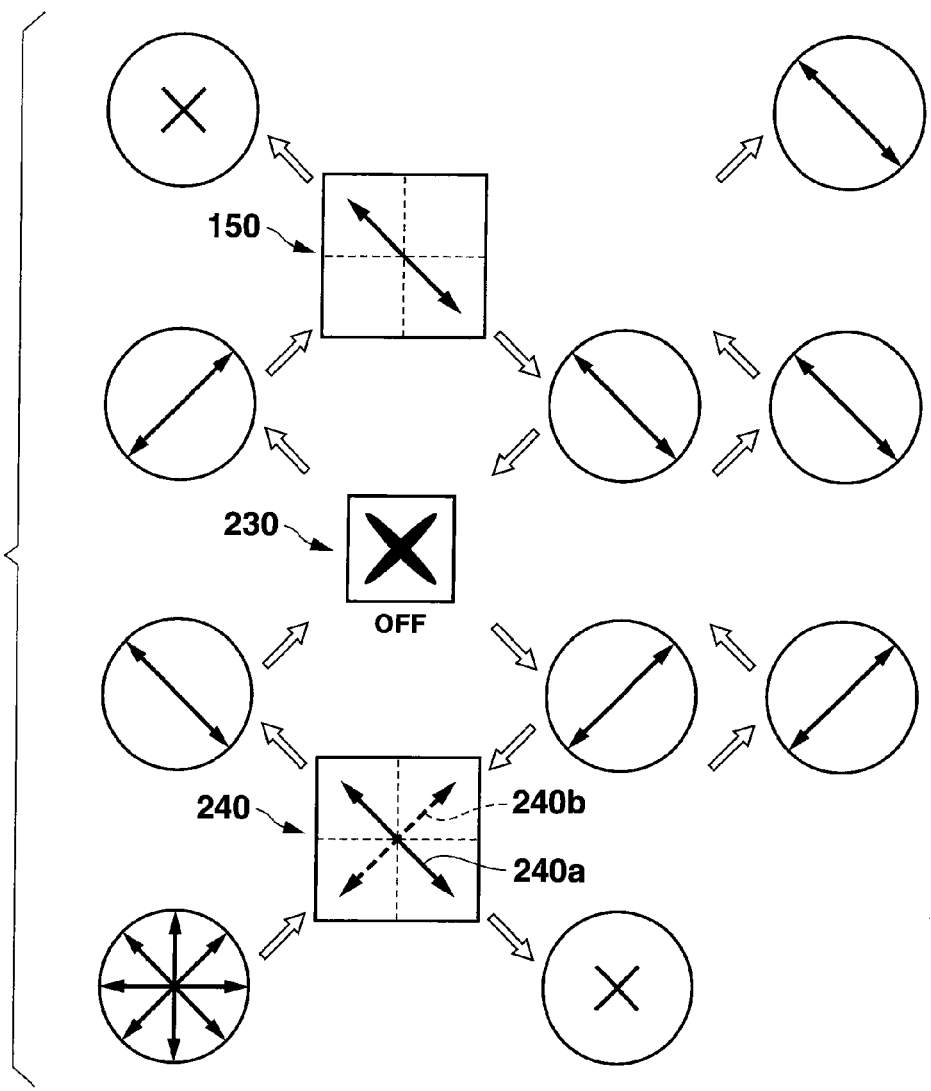
FIG. 7 is a view for explaining the optical path when the switching cell of the liquid crystal display apparatus according to the first modification of the first embodiment of the present invention is OFF.

As a result, when the switching cell 200 is OFF, the liquid crystal display apparatus functions as a reflective liquid crystal display apparatus. That is, the apparatus operates as shown in FIG. 7. In FIG. 7, the middle column schematically illustrates the directions the optical axes of the back surface-side polarizing plate 150, switching cell liquid crystal layer 230, and reflective polarizing plate 240, the left column schematically illustrates the plane of polarization of light emitted by the surface light source 300 serving as a backlight, and the right column schematically illustrates the plane of polarization of light that has passed through the back surface-side polarizing plate 150 from the side of the display panel 100, as in FIGS. 4 and 5.

As shown on the right column of FIG. 7, the plane of polarization of light that has passed through the display panel 100 from the observation side of the liquid crystal display apparatus is coincident with the transmissive axis of the back surface-side polarizing plate 150. The plane of polarization of the light is rotated by 90° upon passing through the switching cell liquid crystal layer 230. Hence, the plane of polarization of the light entering the reflective polarizing plate 240 is coincident with its reflective axis. For this reason, the light that has passed through the display panel 100 is reflected by the reflective polarizing plate 240. Since the plane of polarization of the light is perpendicular to the transmissive axis of the reflective polarizing plate 240, the light entering the reflective polarizing plate 240 does not pass through it.

The light reflected by the reflective polarizing plate 240 passes through the switching cell liquid crystal layer 230 again. At this time, the plane of polarization is rotated by 90°. Hence, the plane of polarization of the light entering the back surface-side polarizing plate 150 is coincident with its transmissive axis. For this reason, the light passes through the back surface-side polarizing plate 150. From then on, the behavior of the transmitted light is the same as that of light that has passed through the back surface-side polarizing plate of a general liquid crystal display apparatus.

On the other hand, as shown on the left column of FIG. 7, out of the light emitted by the backlight, light whose plane of polarization is coincident with the transmissive axis of the reflective polarizing plate 240 passes through the reflective polarizing plate 240. The plane of polarization of the light that has passed through the reflective polarizing plate 240 is rotated by 90° upon passing through the switching cell liquid crystal layer 230. Hence, the plane of polarization of the light entering the back surface-side polarizing plate 150 is perpendicular to its transmissive axis and coincident with its absorption axis. For this reason, the light does not pass through the back surface-side polarizing plate 150.

When the switching cell 200 is ON, the liquid crystal display apparatus functions as a transmissive liquid crystal display apparatus. As shown on the left column of FIG. 8, out of the light emitted by the backlight, light whose plane of polarization is coincident with the transmissive axis of the reflective polarizing plate 240 passes through the reflective polarizing plate 240. The plane of polarization of the light that has passed through the reflective polarizing plate 240 is not rotated upon passing through the switching cell liquid crystal layer 230. Hence, the plane of polarization of the light entering the back surface-side polarizing plate 150 is coincident with its transmissive axis. For this reason, the light passes through the back surface-side polarizing plate 150. From then on, the behavior of the transmitted light is the same as that of light that has passed through the back surface-side polarizing plate of a general liquid crystal display apparatus.

Figure 8:
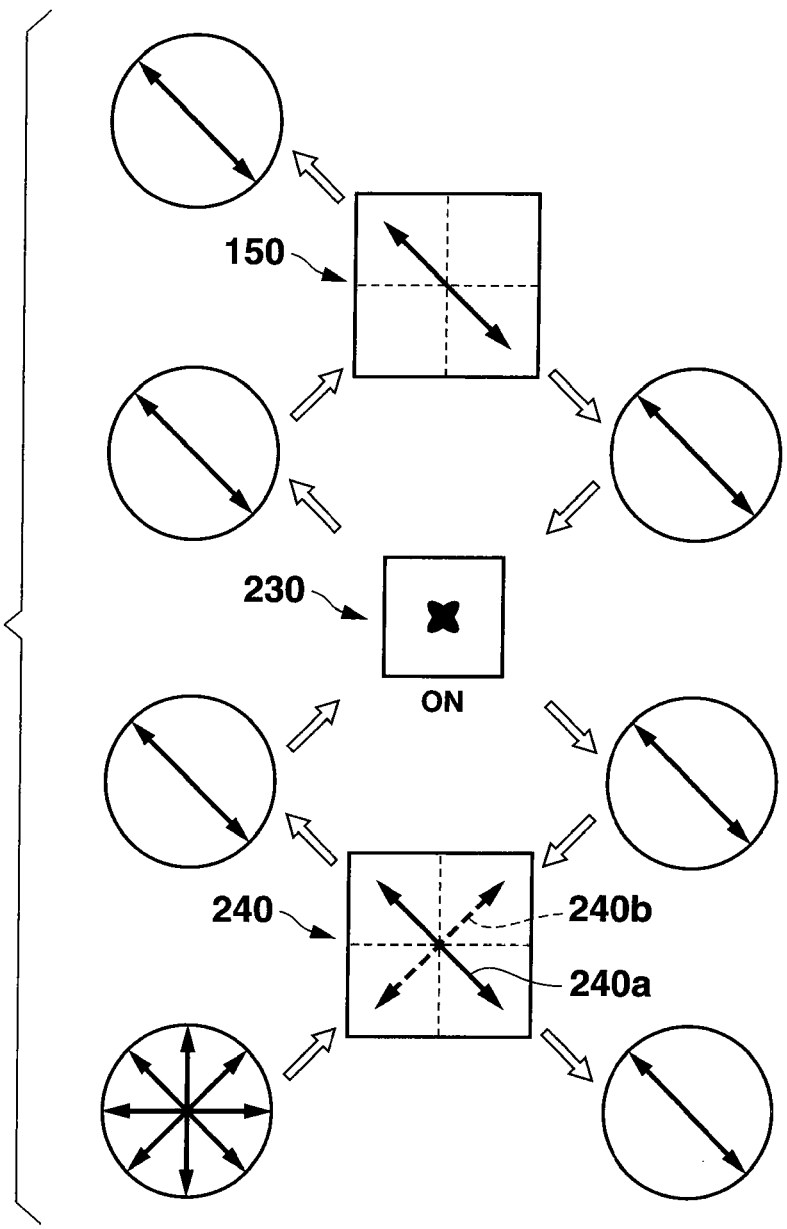

On the other hand, as shown on the right column of FIG. 8, the plane of polarization of light that has passed through the display panel 100 from the observation side of the liquid crystal display apparatus is coincident with the transmissive axis of the back surface-side polarizing plate 150. The plane of polarization of the light is not rotated upon passing through the switching cell liquid crystal layer 230. Hence, the plane of polarization of the light entering the reflective polarizing plate 240 is coincident with its transmissive axis. For this reason, the light that has passed through the display panel 100 passes through the reflective polarizing plate 240. This light is reflected by the backlight surface so as to be reusable as a secondary light source.

As described above, according to the liquid crystal display apparatus of the modification, it is possible to switch the liquid crystal display apparatus between reflective display and transmissive display by turning on/off the switching cell 200, as in the first embodiment. For example, the liquid crystal display apparatus functions as a reflective liquid crystal display apparatus in a bright place such as outdoors and as a transmissive liquid crystal display apparatus in a dark place such as indoors, thereby ensuring display performance with high visibility under any brightness environment.

In the first embodiment, the liquid crystal display apparatus functions as a reflective liquid crystal display apparatus when the switching cell 200 is ON, and as a transmissive liquid crystal display apparatus when the switching cell 200 is OFF. To the contrary, the liquid crystal display apparatus of the modification functions as a reflective liquid crystal display apparatus when the switching cell 200 is OFF, and as a transmissive liquid crystal display apparatus when the switching cell 200 is ON.

The apparatus consumes power when the switching cell 200 is ON. If the liquid crystal display apparatus is often used in a dark environment such as indoors, greater power savings can be achieved by arranging the transmissive and reflective axes of the reflective polarizing plate 240 as in the first embodiment in which the apparatus functions as a transmissive liquid crystal display apparatus when the switching cell 200 is Off. On the other hand, if the liquid crystal display apparatus is often used in a bright environment such as outdoors, greater power savings can be achieved by arranging the transmissive and reflective axes of the reflective polarizing plate 240 as in the first modification in which the apparatus functions as a reflective liquid crystal display apparatus when the switching cell 200 is OFF.

Second Modification of First Embodiment

The second modification of the first embodiment will be described. In this modification, the difference from the first embodiment will be explained. The same reference numerals as in the first embodiment denote the same parts, and a description thereof will not be repeated.

Figure 9:
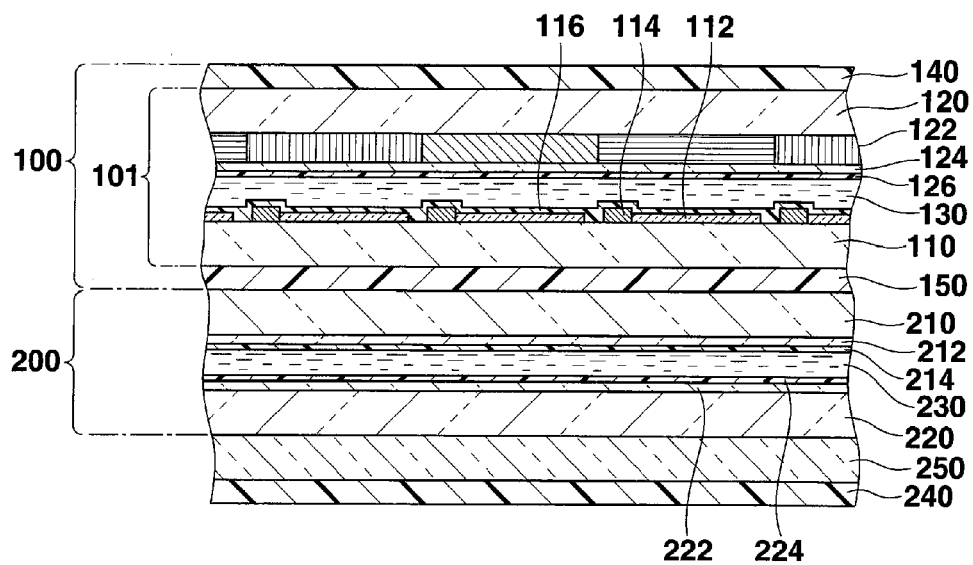
FIG. 9 is a sectional view showing an example of the portion of the display panel, switching cell, light diffusion layer, and reflective polarizing plate of a liquid crystal display apparatus according to the second modification of the first embodiment of the present invention.

In the liquid crystal display apparatus according to this modification, as shown in FIG. 9, a light diffusion layer 250 serving as a first light diffusion member is arranged between the reflective polarizing plate 240 and the backlight-side substrate 220 of the switching cell 200. The light diffusion layer 250 has a function of diffusing light emitted by the backlight and transmitted through the reflective polarizing plate 210 and light input from the back surface-side polarizing plate 150 and reflected by the reflective polarizing plate 240.

When the light diffusion layer 250 is arranged, the liquid crystal display apparatus according to the modification increases the amount of light which enters the back surface-side polarizing plate 150 and passes through it, and thus increases the brightness of the apparatus. In addition, since the directivity of transmitted light and reflected light decreases, the liquid crystal display apparatus can widen its viewing angle and display an image with little brightness inhomogeneity.

The light diffusion layer 250 may contain an adhesive in which scattering particles are dispersed and have a function of bonding the reflective polarizing plate 240 to the backlight-side substrate 220 of the switching cell 200. The same effect as described above can be obtained even when the light diffusion layer 250 is arranged not between the reflective polarizing plate 240 and the backlight-side substrate 220 of the switching cell 200 but between the hack surface-side polarizing plate 150 of the display panel 100 and the display panel-side substrate 210 of the switching cell 200.

Third Modification of First Embodiment

The third modification of the first embodiment will be described. In this modification, the difference from the first embodiment will be explained. The same reference numerals as in the first embodiment denote the same parts, and a description thereof will not be repeated.

Figure 10:
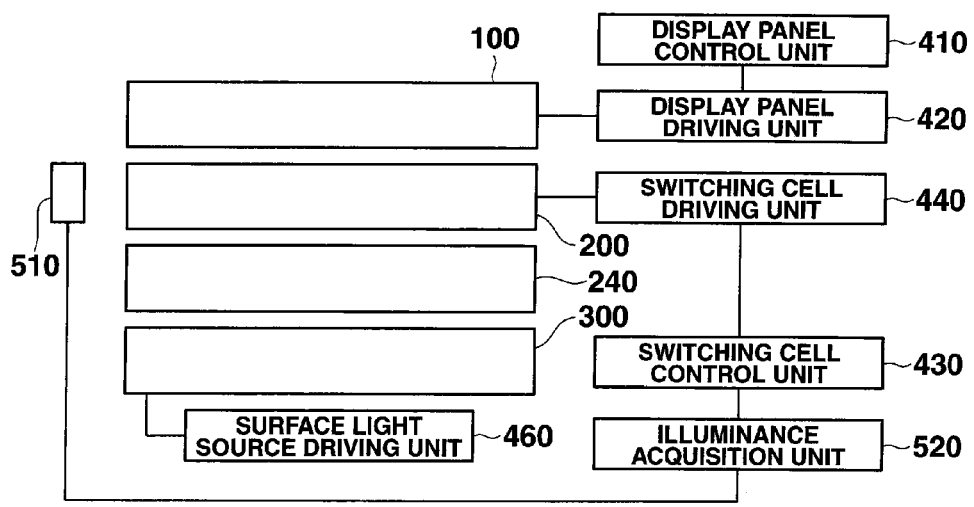
FIG. 10 is a view schematically showing an example of the arrangement of a liquid crystal display apparatus according to the third modification of the first embodiment of the present invention.

The liquid crystal display device according to this modification comprises an illuminance sensor 510, as shown in FIG. 10. Image display on the liquid crystal display device is done by the display panel 100 which is driven by the display panel driving unit 420 under the control of a display panel control unit 410. On the other hand, switching of the liquid crystal display apparatus between a transmissive liquid crystal display apparatus and a reflective liquid crystal display apparatus is done by the switching cell 200 which is driven by the switching cell driving unit 440 under the control of a switching cell control unit 430. The switching cell 200 is the switching cell 200 according to the first, embodiment. The surface light source 300 driven by the surface light source driving unit 460 functions as the backlight of the liquid crystal display device.

The illuminance sensor 510 converts the illuminance of external light under the use environment into an electrical signal and outputs it to an illuminance acquisition unit 520. The illuminance acquisition unit 520 acquires an illuminance value based on the signal input, from the illuminance sensor 510. The illuminance acquisition unit 520 outputs the acquired illuminance value to the switching cell control unit 430. The switching cell control unit 430 determines switching of the switching cell 200 based on the illuminance value input from the illuminance acquisition unit 520. When the illuminance value is equal to or larger than a predetermined threshold, that is, upon determining that the use environment of the liquid crystal display apparatus is bright, the switching cell driving unit 440 drives the switching cell 200 so as to cause the liquid crystal display apparatus to function as a reflective liquid crystal display apparatus. On the other hand, when the illuminance value is smaller than the predetermined threshold, that is, upon determining that the use environment of the liquid crystal display apparatus is dark, the switching cell driving unit 440 drives the switching cell 200 so as to cause the liquid crystal display apparatus to function as a transmissive liquid crystal display apparatus.

As described above, for example, the illuminance sensor 510 and the illuminance acquisition unit 520 function as an illuminometer for measuring the illuminance. For example, the switching cell control unit 430 functions as a switching control unit for controlling the operation of the control driving unit based on the illuminance measured by the illuminometer.

With the above-described arrangement, the liquid crystal display apparatus according to the modification determines for itself based on the illuminance of the use environment whether to function as a transmissive liquid crystal display apparatus or a reflective liquid crystal display apparatus, thereby enabling appropriate display. Hence, the user always enjoys visible display without being aware of the use environment.

Combinations of Modifications of First Embodiment

The modifications of the first embodiment may be used in combinations. With setting the optical axis of the reflective polarizing plate 240 as in the first modification, the light diffusion layer 250 may be installed, and the illuminance sensor 510 may also be provided. The liquid crystal display apparatus according to the first embodiment may include the light diffusion layer 250 and the illuminance sensor 510. In any case, an effect corresponding to the combination can be obtained.

Second Embodiment

The second embodiment of the present invention will be described. In the second embodiment, the difference from the first embodiment will be explained. The same reference numerals as in the first embodiment denote the same parts, and a description thereof will not be repeated.

Figure 11:
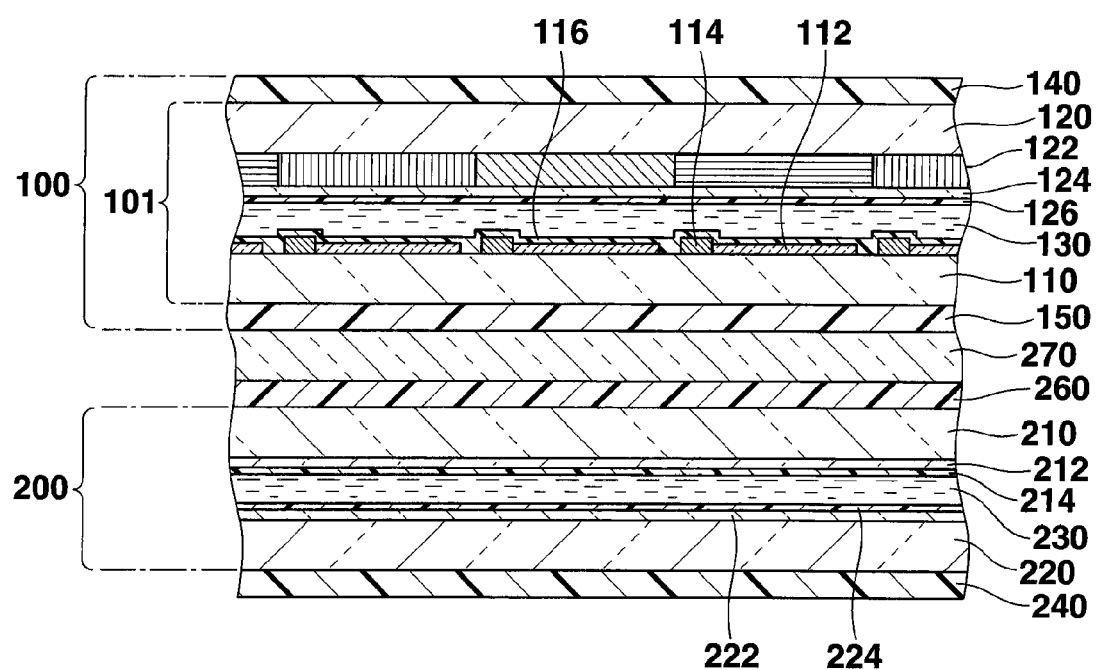
FIG. 11 is a sectional view showing an example of the portion of the display panel, switching cell, reflective polarizing plate, display panel-side reflective polarizing plate, and light diffusion layer of a liquid crystal display apparatus according to the second embodiment of the present invention.
Figure 12:
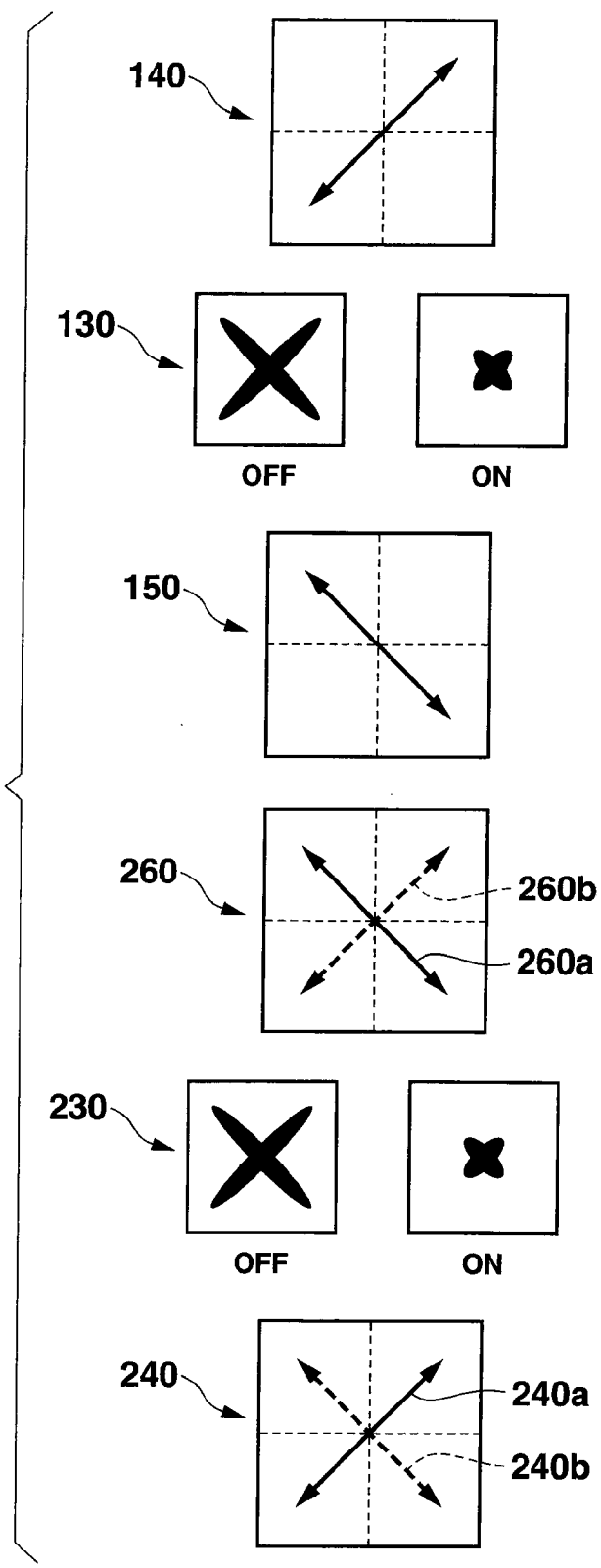
FIG. 12 is a view showing an example of the optical arrangement of the liquid crystal display apparatus according to the second embodiment of the present invention.

As partially shown in the sectional view of FIG. 11, a liquid crystal display apparatus according to this embodiment is formed by installing a light diffusion layer 270 serving as a second light diffusion member and a display panel-side reflective polarizing plate 260 serving as a first reflective polarizing plate. The light diffusion layer 270 and the display panel-side reflective polarizing plate 260 are located from the side closer to a back surface-side polarizing plate 150 between the back surface-side polarizing plate 150 of a display panel 100 and a display panel-side substrate 210 of a switching cell 200 of the liquid crystal display apparatus of the first embodiment. The light diffusion layer 270 is the same as the light diffusion layer 250 according to the second modification of the first embodiment. The display panel-side reflective polarizing plate 260 has the same function as that of a reflective polarizing plate 240. As for the optical axis of the display panel-side reflective polarizing plate 260, as shown in FIG. 12, a display panel-side reflective polarizing plate transmissive axis 260a that is the transmissive axis of the display panel-side reflective polarizing plate 260 is coincident with the transmissive axis of the back surface-side polarizing plate 150, and a display panel-side reflective polarizing plate reflective axis 260b that is the reflective axis of the display panel-side reflective polarizing plate 260 is coincident with the absorption axis of the back surface-side polarizing plate 150.

The optical path of the liquid crystal display apparatus according to this embodiment having the above-described arrangement is in principle the same as in the first embodiment because the transmissive axis of the back surface-side polarizing plate 150 is coincident with the display panel-side reflective polarizing plate transmissive axis 260a. Inserting the display panel-side reflective polarizing plate 260 yields the effect of aligning the plane of polarization of light entering a switching cell liquid crystal layer 230. For this reason, when the apparatus functions as a reflective liquid crystal display apparatus, the switching cell 200 functions in a state closer to the principle described in the first embodiment.

Out of light which exits from the back surface-side polarizing plate 150 and reaches the display panel-side reflective polarizing plate 260, light whose plane of polarization is not coincident with the display panel-side reflective polarizing plate transmissive axis 260a is reflected by the display panel-side reflective polarizing plate 260. The reflected light is diffused by the light diffusion layer 270 and enters the back surface-side polarizing plate 150 again. The so-called recycle effect increases the amount of light to be used for display on the display panel 100. As a result, the light use efficiency rises, contributing to higher-quality display of the liquid crystal display apparatus. Even for light whose plane of polarization is not coincident with the display panel-side reflective polarizing plate transmissive axis 260a out of light which exits from the switching cell liquid crystal layer 230 and reaches the display panel-side reflective polarizing plate 260, the same recycle effect is obtained, contributing to higher-quality display of the liquid crystal display apparatus.

As described above, the liquid crystal display apparatus according to the embodiment can not only obtain the same effect as that of the liquid crystal display apparatus according to the first embodiment but also display a brighter image with higher quality due to the effects of the display panel-side reflective polarizing plate 260 and the light diffusion layer 270.

The liquid crystal display apparatus according to the embodiment can also adopt the arrangements of the same modifications as those of the first embodiment and obtain the same effects as in the modifications of the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus comprising:
   a first polarizing plate;
   a liquid crystal display cell adjacent to the first polarizing plate;
   a second polarizing plate arranged on a side of the liquid crystal display cell opposite to the first polarizing plate;
   a first reflective polarizing plate adjacent to the second polarizing plate on a side opposite to the liquid crystal display cell, wherein a transmissive axis of the first reflective polarizing plate is coincident with a transmissive axis of the second polarizing plate;
   a switching cell arranged on a side of the first reflective polarizing plate opposite to the second polarizing plate, wherein the switching cell is configured to rotate a plane of polarization of light passing through the switching cell;
   a second reflective polarizing plate arranged on a side of the switching cell opposite to the first reflective polarizing plate;
   a surface light source arranged on a side of the second reflective polarizing plate opposite to the switching cell; and
   a control driving unit configured to switch the switching cell between a first state and a second state,
   wherein the first state is a state in which a plane of polarization of polarized light emitted by the surface light source and transmitted through the second reflective polarizing plate and the switching cell is coincident with the transmissive axis of the first reflective polarizing plate and the transmissive axis of the second polarizing plate, and a plane of polarization of polarized light input to the liquid crystal display cell from a side of the first polarizing plate and transmitted through the second polarizing plate, the first reflective polarizing plate and the switching cell is coincident with a transmissive axis of the second reflective polarizing plate, and
   wherein the second state is a state in which the plane of polarization of the polarized light emitted by the surface light source and transmitted through the second reflective polarizing plate and the switching cell is coincident with a reflective axis of the first reflective polarizing plate and an absorption axis of the second polarizing plate, and the plane of polarization of the polarized light input to the liquid crystal display cell from the side of the first polarizing plate and transmitted through the second polarizing plate, the first reflective polarizing plate and the switching cell is coincident with a reflective axis of the second reflective polarizing plate.

2. The liquid crystal display apparatus according to claim 1, wherein the switching cell comprises:
   a first substrate arranged on the side of the first reflective polarizing plate;
   a second substrate arranged on the side of the second reflective polarizing plate;
   a first electrode formed on the first substrate, the first electrode facing the second substrate;
   a first alignment film formed on the first electrode;
   a second electrode formed on the second substrate, the second electrode facing the first electrode;
   a second alignment film formed on the second electrode; and
   a liquid crystal layer including liquid crystal molecules,
   wherein the liquid crystal layer is arranged between the first alignment film and the second alignment film, and the control driving unit controls a voltage difference between the first electrode and the second electrode to switch the switching cell between the first state and the second state.

3. The liquid crystal display apparatus according to claim 2, wherein the first alignment film and the second alignment film undergo an aligning treatment, and wherein a direction of the aligning treatment for the first alignment film and a direction of the aligning treatment for the second alignment film make an angle of 90°.

4. The liquid crystal display apparatus according to claim 1, wherein the reflective axis of the second reflective polarizing plate is coincident with the transmissive axis of the second polarizing plate.

5. The liquid crystal display apparatus according to claim 4, further comprising a light diffusion member arranged between the switching cell and the second reflective polarizing plate.

6. The liquid crystal display apparatus according to claim 1, wherein the reflective axis of the second reflective polarizing plate is perpendicular to the transmissive axis of the second polarizing plate.

7. The liquid crystal display apparatus according to claim 6, further comprising a light diffusion member arranged between the switching cell and the second reflective polarizing plate.

8. The liquid crystal display apparatus according to claim 1, further comprising a light diffusion member arranged between the switching cell and the second reflective polarizing plate.

9. The liquid crystal display apparatus according to claim 1, further comprising a light diffusion member arranged between the second polarizing plate and the first reflective polarizing plate.

10. The liquid crystal display apparatus according to claim 1, further comprising:
    an illuminometer configured to measure an illuminance around the liquid crystal display apparatus; and
    a switching control unit configured to control an operation of the control driving unit based on the illuminance measured by the illuminometer.

11. A liquid crystal display apparatus comprising:
    a first polarizing plate;
    an active matrix liquid crystal display cell adjacent to the first polarizing plate;

a second polarizing plate arranged on a side of the active matrix liquid crystal display cell opposite to the first polarizing plate;

a first reflective polarizing plate adjacent to the second polarizing plate on a side opposite to the active matrix liquid crystal display cell, wherein a transmissive axis of the first reflective polarizing plate is coincident with a transmissive axis of the second polarizing plate;

a switching cell arranged on a side of the first reflective polarizing plate opposite to the second polarizing plate, wherein the switching cell is configured to rotate a plane of polarization of light passing through the switching cell;

a second reflective polarizing plate arranged on a side of the switching cell opposite to the first reflective polarizing plate;

a surface light source arranged on a side of the second reflective polarizing plate opposite to the switching cell; and a control driving unit configured to switch the switching cell between a first state and a second state, wherein the first state is a state in which a plane of polarization of polarized light emitted by the surface light source and transmitted through the second reflective polarizing plate and the switching cell is coincident with the transmissive axis of the first reflective polarizing plate and the transmissive axis of the second polarizing plate, and a plane of polarization of polarized light input to the active matrix liquid crystal display cell from a side of the first polarizing plate and transmitted through the second polarizing plate, the first reflective polarizing plate and the switching cell is coincident with a transmissive axis of the second reflective polarizing plate, and wherein the second state is a state in which the plane of polarization of the polarized light emitted by the surface light source and transmitted through the second reflective polarizing plate and the switching cell is coincident with a reflective axis of the first reflective polarizing plate and an absorption axis of the second polarizing plate, and the plane of polarization of the polarized light input to the active matrix liquid crystal display cell from the side of the first polarizing plate and transmitted through the second polarizing plate, the first reflective polarizing plate and the switching cell is coincident with a reflective axis of the second reflective polarizing plate.

12. The liquid crystal display apparatus according to claim 11, wherein the switching cell comprises:

a first substrate arranged on the side of the first reflective polarizing plate;

a second substrate arranged on the side of the second reflective polarizing plate;

a first electrode formed on the first substrate, the first electrode facing the second substrate;

a first alignment film formed on the first electrode;

a second electrode formed on the second substrate, the second electrode facing the first electrode;

a second alignment film formed on the second electrode; and a liquid crystal layer including liquid crystal molecules, wherein the liquid crystal layer is arranged between the first alignment film and the second alignment film, and the control driving unit controls a voltage difference between the first electrode and the second electrode to switch the switching cell between the first state and the second state.

13. The liquid crystal display apparatus according to claim 12, wherein the first alignment film and the second alignment film undergo an aligning treatment, and wherein a direction of the aligning treatment for the first alignment film and a direction of the aligning treatment for the second alignment film make an angle of 90°.

14. The liquid crystal display apparatus according to claim 11, wherein the reflective axis of the second reflective polarizing plate is coincident with the transmissive axis of the second polarizing plate.

15. The liquid crystal display apparatus according to claim 14, further comprising a light diffusion member arranged between the switching cell and the second reflective polarizing plate.

16. The liquid crystal display apparatus according to claim 11, wherein the reflective axis of the second reflective polarizing plate is perpendicular to the transmissive axis of the second polarizing plate.

17. The liquid crystal display apparatus according to claim 16, further comprising a light diffusion member arranged between the switching cell and the second reflective polarizing plate.

18. The liquid crystal display apparatus according to claim 11, further comprising a light diffusion member arranged between the switching cell and the second reflective polarizing plate.

19. The liquid crystal display apparatus according to claim 11, further comprising a light diffusion member arranged between the second polarizing plate and the first reflective polarizing plate.

20. The liquid crystal display apparatus according to claim 11, further comprising: an illuminometer configured to measure an illuminance around the liquid crystal display apparatus; and a switching control unit configured to control an operation of the control driving unit based on the illuminance measured by the illuminometer.

* * * * *